United States Patent [19]

Rao et al.

[11] 4,112,133

[45] Sep. 5, 1978

[54] LIQUID SMOKE COMPOSITION AND METHOD OF MAKING SAME

[75] Inventors: Ganta V. Rao; Floyd K. Shoup, both of Hutchinson, Kans.; Gerald R. Popenhagen, Sandusky, Ohio

[73] Assignee: Far-Mar-Co, Inc., Hutchinson, Kans.

[21] Appl. No.: 727,651

[22] Filed: Sep. 29, 1976

[51] Int. Cl.² ............................................. A23L 1/221
[52] U.S. Cl. ................................... 426/650; 426/330; 426/652; 426/422; 426/442
[58] Field of Search ............... 426/314, 315, 330, 533, 426/650, 652, 655, 422, 442

[56] References Cited

U.S. PATENT DOCUMENTS

| 3,106,473 | 10/1963 | Hollenbeck | 426/650 |
| 3,806,609 | 4/1974 | Goblik et al. | 426/650 |
| 3,873,741 | 3/1975 | Melcer et al. | 426/650 |
| 3,875,314 | 4/1975 | Wistreich et al. | 426/650 X |

OTHER PUBLICATIONS

Rusanov, Chemical Abstracts, vol. 84:178313b.

*Primary Examiner*—Raymond N. Jones
*Assistant Examiner*—Esther M. Kepplinger
*Attorney, Agent, or Firm*—Stuart J. Friedman

[57] ABSTRACT

Improved liquid smoke compositions which do not form undesirable solids during use or storage can be prepared by admixing a natural liquid smoke solution including constituent phenols, carbonyls and acids, an acidulating agent in addition to the constituent acids and a solubilizing agent, the quantities of the acidulating and solubilizing agents varying with the concentrations of phenols and carbonyls, respectively, in the natural liquid smoke solution. For presently known, commercially available liquid smoke solutions, the compositions comprise about 1.5–3% by weight acidulant and 3–8% by weight solubilizing agent, all percentages being stated by weight of the composition.

32 Claims, No Drawings

LIQUID SMOKE COMPOSITION AND METHOD OF MAKING SAME

BACKGROUND OF THE INVENTION

The present invention relates to improved liquid smoke compositions as well as to method of making such compositions and, more particularly, to liquid smoke compositions including additives which prevent undesirable solids formation therein.

The use of natural liquid smoke solutions in lieu of direct smoking to impart smoky flavor and appearance to food products such as meat, cheese, fish and the like, has been known and commercially practiced for some time. Liquid smokes are generally aqueous solutions capable of imparting a smoky hue or coloration and/or a smoky flavor to comestibles exposed to the liquid smoke or its vapor phase. Conventional techniques for preparing liquid smoke solutions involve the burning of wood (e.g. hardwoods such as hickory or maple) and the condensation or extraction of the constituents of the smoke formed from the burning of such woods. Typically, the smoke constituents are extracted by condensation or absorption in an aqueous medium followed by concentration of the resulting solution. Exemplary liquid smoke solutions and methods for making same are described in U.S. Pat. Nos. 3,106,473, 3,523,802, 3,806,609, 3,873,741 and 3,875,314. The concentrated smoke solutions may be employed in a number of ways to impart the smoky coloration and/or flavor to food products. For example, one procedure is to dip the food products directly into the liquid smoke. In another procedure the liquid smoke solution is sprayed through nozzles onto the food products in a spray chamber. Still other procedures include vaporizing the liquid smoke and exposing the food products to the vapors so produced and incorporating the liquid smoke directly into the food products.

Regardless of the method by which the natural liquid smoke solutions are made or the procedures by which they are applied to the food products, a universal problem associated with the use of liquid smoke is the tendency of the solutions to form polymeric solids which settle to the bottom of the solution containers during storage or deposit on equipment surfaces or clog liquid smoke spray nozzles. This settlement or deposition of solids is undesirable for at least the following reasons: (a) important flavoring and coloring constituents of the liquid smoke settle with the solids and are lost from the solution, thereby reducing the effectiveness of the solution; (b) the replenishment frequency for the liquid smoke solutions is increased by the losses caused by settling; (c) the liquid smoke solutions have an undesirable appearance; and (d) the deposited solids cause general cleaning problems and require production shut downs from time to time to allow equipment cleaning.

SUMMARY OF THE INVENTION

It is therefore an object of the present invention to provide an improved liquid smoke composition from which there is no solids settlement during storage or use.

It is another object of the invention to provide a method for preventing solids settlement from liquid smoke solutions.

It is still another object of the invention to provide liquid smoke compositions and method of making same, which compositions have a desirable appearance during storage and use, exhibit excellent flavoring and coloring capabilities and which are at least as economical to use as heretofore known liquid smoke solutions.

Other objects and advantages will become apparent from the following description and appended claims.

Briefly stated, in accordance with the aforesaid objects, the present invention provides an improved liquid smoke composition which includes a solubilizing additive therein for preventing solids formation in the composition. The additive consists essentially of a food grade acidulant and a solubilizing agent selected from the group consisting of sorbitan fatty compounds, polyoxyethylene sorbitan fatty compounds, polyoxyethylene fatty compounds, polyoxyethylene glycols, and mixtures thereof. The acidulant and solubilizing agent are present in the composition in amounts keyed to the quantity of phenols and carbonyls in the liquid smoke composition, which amounts range from about 1.5 to 3 weight percent acidulant and from about 3 to 8 weight percent solubilizing agent for presently known commercially available liquid smoke solutions, said percentage based on the total liquid smoke composition, i.e. the liquid smoke solution, acidulant, solubilizing agent and any trace quantities (generally less than about 0.1% by weight) of non-interfering additives.

It has been found that when liquid smoke solutions are treated by adding thereto the appropriate quantities of acidulant and solubilizing agent, the tendency for solids to form in and settle from the solution is eliminated without any detrimental effect on the flavoring or coloring capabilities of the liquid smoke. Indeed, the coloring and flavoring capabilities of the liquid smoke are improved by virtue of preventing the formation of solids because valuable color and flavor influencing constituents are retained in the solution. Many advantages are realized by use of the improved liquid smoke compositions and/or by practice of the method of the present invention:

1. Equipment Cleaning Problems Are Eliminated: By reducing or eliminating the tendency of the liquid smoke solution to form solids, the problems associated with cleaning the equipment used in handling the liquid smoke and applying the liquid smoke to food products are eliminated. Most noteworthy is that food smoking equipment no longer need be shut down periodically to clean liquid smoke spray nozzles which have become fouled and/or clogged.

2. Product Appearance Is Improved: By eliminating solids formation and settlement, the inside surfaces of liquid smoke containers are no longer covered with unsightly deposits. In addition, the improved liquid smoke compositions can be diluted with water and will remain clear, i.e., turbidity caused by dilution of heretofore known liquid smoke solutions is eliminated.

3. The Smoked Products Are Improved: The elimination of solids formation and settlement prevents the loss from solution of important flavoring and coloring constituents. As a result the liquid smoke solutions are more uniform; their coloring and flavoring capabilities do not diminish merely as a result of the passage of time; and the smoked products have a predictable and more uniform color and flavor.

4. Ecological Problems Are Eliminated: By preventing solids formation, there is no solid polymeric waste to dispose of during or following liquid smoke processing of food products.

5. Economics of Applying Liquid Smoke Are Enhanced: The liquid smoke compositions of the present invention are less expensive to use notwithstanding the addition to conventional liquid smoke solutions of acidulating and solubilizing agents. This is because the improved liquid smoke compositions can be used in diluted form without loss of flavoring and coloring compositions; because plant shut-down for equipment cleaning is eliminated; and because no flavoring or coloring constituents are lost from the solution by settlement, thereby decreasing replenishment requirements.

DETAILED DESCRIPTION OF THE INVENTION

As previously indicated, natural liquid smoke is prepared by the absorption, in an aqueous solution, of smoke derived from the burning of hardwoods. The resulting liquid smoke, herein referred to as "liquid smoke solutions," represents the entire spectrum of desirable smoke flavoring and coloring constituents. The components of liquid smoke solutions primarily responsible for the distinctive flavor and color are found in the steam distillable fraction and comprise mainly phenols, carbonyls and acids. The acid content of the smoke solution is measured by the solution's total acidity expressed as a percentage by weight based on an equivalent quantity of glacial acetic acid. Thus, presently available liquid smoke solutions can be purchased as 3% acetic acid, 6% acetic acid, 8.5% acetic acid and 10% acetic acid. The acids present in nautral liquid smoke include valeric acid, butyric acid, levulinic acid, tiglic acid, acetic acid, propionic acid and fumaric acid. It is interesting, however, that although the acidity contributed by these constituent acids is measurable, the acid constituents cannot be fractionated from the liquid smoke, thereby precluding their availability for other purposes, as will become apparent hereinafter. The phenol constituent of the liquid smoke solutions, which in commercially available liquid smoke ranges in concentration from about 1250–2500 mg/l, but may vary from these values depending upon the method of making the liquid smoke solutions, are believed to be the main contributor to the smoke odor and flavor. The carbonyls also contribute to the smoke flavor, but their major contribution is believed to be the "smoky" brown color characteristic of smoked foods.

It is believed, although the invention is not intended to be limited by expression of any particular theory, that the constituents of liquid smoke solutions, particularly the phenols and carbonyls, tend to react in undesirable condensation and/or polymerization reactions to form polymeric reaction products which are solid and settle out of solution. This belief has been confirmed by measurements which indicate that both the phenol and carbonyl levels in the liquid smoke solutions decrease with increasing solids formation. The result is that valuable flavoring and coloring constituents are lost from the solution and the food products treated therewith generally exhibit reduced quality and acceptance.

In accordance with the present invention it has been determined that the tendency of a liquid smoke solution to form and settle polymeric solids can be eliminated by treating the solution with an additive consisting essentially of a food grade acid and a solubilizing agent selected from sorbitan fatty compounds, polyoxyethylene sorbitan fatty compounds, polyoxyethylene fatty compounds, polyoxyethylene glycols, and mixtures thereof. The resulting composition, consisting essentially of a liquid smoke solution, an acidulant and a solubilizing agent as set forth hereinabove, including trace quantities (less than about 0.1% by weight) of non-interfering additives, remains clear and free of polymeric material in both the diluted and undiluted states and maintains the original coloring and flavoring capability of untreated liquid smoke solutions. Prolonged storage studies on these liquid smoke compositions indicate complete elimination of the undesirable condensation and polymerization reactions. In fact, it has been observed that when appropriate quantities of the acidulating and solubilizing agents of the present invention are introduced into turbid smoke solutions in which polymeric material formation has already occurred, the polymeric material becomes solubilized and the turbid solution becomes clear.

The acidulant component of the additive is believed to prevent crystallization in the liquid smoke solution and, more specifically, solubilizes and maintains phenols in solution. In this connection, it has been noted that in commercially available liquid smoke solutions not modified in accordance with the present invention, the phenol concentration decreases with time as solids settlement occurs. The acidulant useful herein may be any food grade acidulating agent approved for human consumption, or combinations thereof, subject, of course, to any governmental or health limitations as to usage levels. Exemplary, but not limiting, of acidulants suitable for use in the present invention are citric acid, acetic acid, formic acid, phosphoric acid, maleic acid, ascorbic acid, tartaric acid, lactic acid, tiglic acid, fumaric acid, adipic acid and succinic acid, as well as mixtures thereof. It is noteworthy that although the acidulant may be an acid which is already a constituent acid of natural liquid smoke solutions, the acidulant is present as unbound acid whereas the constituent acids of natural liquid smoke, as previously indicated, are effectively unavailable to solubilize phenols. The acidulant may be employed in either liquid (e.g., acetic acid) or solid (e.g., citric acid) form, depending only on which is easiest to use in the circumstances. It will, of course be appreciated by those skilled in the art that use of some acidulants may make a minor contribution to the flavor of the liquid smoke composition. This is generally undesirable and acidulants which make very little or no flavor contribution to the composition are most preferred. For this reason, as well as because they are relatively abundant and easy to obtain, acetic acid and citric acid are the preferred acidulants.

The quantity of acidulating agent added to the natural liquid smoke solutions in forming the improved liquid smoke compositions of the present invention is directly keyed to the quantity of phenols in the liquid smoke solution. It has been found that not less than 2 percent acidulating agent by weight of the liquid smoke composition is required where the phenol content is in the range from 1500 to less than 2000 mg/l. The minimum recommended quantity of acidulant varies from this 2% value with increasing or decreasing phenol content at the rate of plus or minus about 0.5% by weight acidulating agent for each increase or decrease, respectively, of about 500 mg/l of phenols. This concentration of acidulant in the composition is independent of the initial acidity of the liquid smoke solution used in preparing the composition. The following tabulation sets forth the minimum recommended acidulant concentration levels in percent by weight of liquid smoke composition (%) for 500 mg/l increments of phenol concentration. It should be appreciated that more than the minimum recommended acidulant concentration may be used without adverse effect although use of an excess of acidulant confers no ascertainable benefit and is, therefore, unnecessary and uneconomical.

| Phenol concentration (mg/l) | | Acidulant (%) |
|---|---|---|
| From | less than | |
| 1000 | 1500 | 1.5 |
| 1500 | 2000 | 2 |
| 2000 | 2500 | 2.5 |
| 2500 | 3000 | 3.0 |

The solubilizing component of the additive is believed to block the reactive sites of the liquid smoke, thus preventing side reactions, such as polymerization, with the result that the carbonyls are kept in solution. The compounds which have been found to be suitable for use herein as solubilizing agents have found utility elsewhere as non-ionic emulsifiers or dispersants with surface active properties. However, it is important to note that in the present invention, these compounds act as neither emulsifiers nor dispersants. Emulsification and dispersion are typically physical mechanisms whereby immiscible liquids are held in suspension and/or fine solid particles are uniformly separated in a suspending medium. Inasmuch as the acidulant and solubilizing agent act to prevent the formation of solids in the clear liquid smoke solution, it should be apparent that neither the present process nor the instant improved liquid smoke composition contemplates the formulation or stabilization of dispersions or suspensions.

Suitable solubilizing agents must be approved for use in foods consumed by humans and are preferably water soluble since virtually all liquid smoke solutions are aqueous. Preferred solubilizing agents include sorbitan fatty compounds, polyoxyethylene sorbitan fatty compounds, polyoxyethylene fatty compounds, polyoxyethylene glycols having molecular weights of at least 400, and mixtures of suitable solubilizing agents. Other solubilizing agents may also work but are not practical for use because they are not food-grade approved, e.g., alkyl polyether compounds (e.g., acids, esters, alcohols), are grossly uneconomical, or impart an undesirable taste to the compositions. Most useful are the aforementioned preferred solubilizing agents wherein the fatty chain contains from 12 to 22 carbon atoms ($C_{12}$-$C_{22}$). The saturated mono-acids, saturated mono-alcohols, and mono-esters are the primarily useful forms of the compounds, although the unsaturated acids and alcohols are also suitable. Exemplary of particularly preferred solubilizing agents are those available commercially under the trademark "Tween," such as polyoxyethylene sorbitan mono-oleate (polysorbate 80 or Tween 80), polyoxyethylene sorbitan monostearate (polysorbate 60 or Tween 60), polyoxyethylene sorbitan monopalmitate (polysorbate 40 or Tween 40), polyoxyethylene sorbitan monolaurate (polysorbate 20 or Tween 20); those available commercially under the trademark "Span", such as sorbitan monostearate (Span 60), sorbitan mono-oleate (Span 80), sorbitan trioleate (Span 85); and commercially available polyoxyethylene glycols having molecular weights of about 400, 4000 and 6000.

The quantity of solubilizing agent added to the natural liquid smoke solutions in forming the improved liquid smoke compositions of the present invention is directly keyed to the quantity of carbonyls in the liquid smoke solution. It has been found that not less than 4 percent solubilizing agent by weight of the liquid smoke composition is required where the carbonyl content is in the range from 3000 to less than 3500 mg/l. The minimum recommended quantity of solubilizing agent varies from this 4% value with increasing or decreasing carbonyl content at the rate of plus or minus about 0.5% by weight solubilizing agent for each increase or decrease, respectively, of about 500 mg/l of carbonyls. Thus, for carbonyl concentrations in the range 2500 to less than 3000 mg/l, the solubilizing agent concentration in the composition should not be less than 3.5% by weight. Likewise, for carbonyl concentrations in the range 3500 to less than 4000 mg/l, the solubilizing agent concentration in the composition should not be less than 4.5% by weight. The following tabulation sets forth the minimum recommended solubilizing agent concentration levels in percent by weight of liquid smoke composition (%) for 500 mg/l increments of carbonyl concentration. It should be appreciated that more than the minimum recommended solubilizing agent concentration may be used without adverse effect although use of an excess of solubilizing agent confers no ascertainable benefit and is, therefore, unnecessary and uneconomical.

| Carbonyl concentration (mg/l) | | Solubilizing Agent (%) |
|---|---|---|
| From | Less than | |
| 2000 | 2500 | 3.0 |
| 2500 | 3000 | 3.5 |
| 3000 | 3500 | 4.0 |
| 3500 | 4000 | 4.5 |
| 4000 | 4500 | 5.0 |
| 4500 | 5000 | 5.5 |
| 5000 | 5500 | 6.0 |
| 5500 | 6000 | 6.5 |
| 6000 | 6500 | 7.0 |
| 6500 | 7000 | 7.5 |
| 7000 | 7500 | 8.0 |

In accordance with the practice of the present invention it is necessary to modify natural liquid smoke solutions by the addition of both an acidulating agent and a solubilizing agent in order to achieve the intended benefit, i.e., prevention of solids formation and settlement. The specific method or sequence of addition is unimportant and any generally used method for mixing chemicals is suitable. Moreover, the acidulating agent and solubilizing agent can be added at any point in the liquid smoke manufacturing process provided only that the additions are made following the condensation of the smoke. The temperature at which the instant method is practiced is not very important. It is contemplated that in most situations the process will be practiced at room temperature, although any temperature above freezing and below boiling is suitable. Preferably, however, the process will be practiced between 4.5° C. and 37.5° C. When the process is practiced as described herein, by mixing the requisite amounts of acidulating and solubilizing agents with the natural liquid smoke solution, the resulting composition will include the ingredients in the following proportions for presently available natural liquid smoke solutions having phenol concentrations in the range from about 1250-2500 mg/l and carbonyl concentrations in the range from about 2000-7000 mg/l (all percentages are by weight of the liquid smoke composition):

| | |
|---|---|
| Natural liquid smoke solution | 89-95.5% |
| Acidulant | 1.5-3% |

| | |
|---|---|
| -continued | |
| Solubilizing Agent | 3–8% |

To demonstrate the practice of the present invention and to show by comparison the effectiveness of the instant improved liquid smoke compositions, various commercially available liquid smoke solutions were treated with varying quantities of acidulants and solubilizing agents, individually and in combination, and the tendency to settle solids from the solutions and compositions in use and during prolonged storage was observed. In addition, the liquid smoke compositions were used for coloring and flavoring on various smoked meat products. The following Examples set forth the tests conducted the results obtained.

EXAMPLE I

To 20 parts of a natural liquid smoke solution having a phenol concentration of 1700 mg/l and a carbonyl concentration of 3000 mg/l was added 80 parts of water. Upon addition of the water, the solution immediately became very turbid. The solution was heated to 110° F., a temperature commonly employed when treating food products with liquid smoke. The liquid smoke remained turbid and, after 48 hours, an undesirable heavy precipitate had formed in the container.

EXAMPLE II

A quantity of the undiluted liquid smoke solution from Example I was placed in a closed container in storage for a period of 3 months. By the end of that time a large quantity of undesirable resinous material had formed in the container.

EXAMPLE III

The undiluted liquid smoke solution from Example I and a liquid smoke solution having a phenol concentration of 2000 mg/l and a carbonyl concentration of 5200 mg/l were used to treat frankfurters in accordance with the procedure described below. Both smoke solutions resulted in a smoky flavored and colored cooked frankfurter typical of a product processed with liquid smoke containing this concentration of carbonyl and phenol.

Treating Procedure

Frankfurters were dipped in each liquid smoke solution at 110° F. for 30 seconds after which the frankfurters were sequentially heated
- to 130° F. for 15 minutes,
- to 140° F. for 15 minutes,
- to 150° F. for 15 minutes,
- to 160° F. for 30 minutes,
- to 180° F. for 15 minutes, until the internal temperature of the frankfurters was in the range 150°–155° F. Thereafter the frankfurters were steamed for 3 minutes at 160° F. and showered with cold water until the internal temperature reduced to 100° F.

EXAMPLE IV

To 96 parts by weight of the undiluted liquid smoke solution of Example I was added 4 parts by weight of Tween 80 and mixed well to obtain a uniform solution. No turbidity was immediately obvious. The solution was next heated to 110° F. whereupon it became slightly turbid and remained turbid after 48 hours at 110° F. At that time some precipitate was already present in the container. After prolonged storage (3 months) the precipitate remained.

EXAMPLE V

The procedure of Example IV was repeated except that 95 parts by weight of undiluted liquid smoke solution from Example I, 4 parts by weight Tween 80 and about 1 part by weight citric acid were admixed. As in Example IV, no turbidity was immediately obvious. However, turbidity appeared after heating to 110° F. and moderate amounts of precipitate were present after 48 hours. After prolonged storage (3 months) the precipitate remained.

EXAMPLE VI

The procedure of Example IV was repeated except 96 parts by weight of undiluted liquid smoke solution from Example I, about 3 parts by weight Tween 80 and about 1 part by weight citric acid were admixed. The resulting solution remained clear until heated to 110° F. at which time it became moderately turbid. After 48 hours a relatively large amount of precipitate had formed in the container. Following prolonged storage (3 months) additional precipitate had formed and settled.

EXAMPLE VII

The procedure of Example IV was repeated using a liquid smoke solution having a phenol concentration of 2000 mg/l and a carbonyl concentration of 5200 mg/l. The composition consisted of 94 parts by weight of the liquid smoke solution, 4 parts by weight Tween 80 and 2 parts by weight glacial acetic acid. The composition was clear when formed but became turbid upon heating to 110° F. After 48 hours at 110° F., not only was there turbidity but some precipitate had formed and settled to the bottom of the container. After prolonged storage (3 months) the precipitate remained.

Examples I–VII demonstrate that inadequate concentrations of solubilizing agent, based on the teachings of the present invention cannot eliminate undesirable solids formation and settlement. Likewise, use of adequate concentrations of solubilizing agent based on the teachings of the present invention in the absence of any or adequate concentrations of acidulant will not eliminate undesirable solids formation and settlement.

The following Examples illustrate the successful practice of the present invention.

EXAMPLE VIII

A liquid smoke composition was formed consisting of 94 parts by weight of the undiluted liquid smoke solution of Example I, 4 parts by weight Tween 80 and 2 parts by weight glacial acetic acid. The composition was admixed thoroughly. The resulting solution was clear when formed and remained clear after 48 hours heating at 110° F. The solution was placed in a closed container in prolonged storage (3 months) following which the solution was examined. No turbidity or undesirable precipitate was present in the storage container.

The same composition, consisting of liquid smoke solution, acidulant and Tween 80 was diluted with water to 80:20 by volume water to composition and checked for turbidity and/or solids formation after 48 hours heating at 110° F. and after 3 months storage. No turbidity or precipitate was noted.

EXAMPLE IX

The procedure of Eample VIII was repeated three times using the undiluted liquid smoke composition of Example VIII except that in lieu of glacial acetic acid, the acidulants employed were:
(1) formic acid;
(2) phosphoric acid;
(3) vinegar (In this case sufficient vinegar was added until the equivalent of 2% by weight glacial acetic acid was present. Since vinegar is predominantly water, the resulting liquid smoke composition was quite diluted).

In each case, no turbidity or precipitate was noted upon formation of the composition, after 48 hours heating at 110° F., or after 3 months storage.

EXAMPLE X

The procedures of Examples VIII and IX were repeated by forming liquid smoke compositions containing an excess of solubilizing agent (Tween 80) and a slight excess of acidulant as follows:

| | |
|---|---|
| liquid smoke solution | 91.6 parts by weight |
| Tween 80 | 6 parts by weight |
| Acidulant | 2.4 parts by weight |

The acidulants employed were citric acid, formic acid, phosphoric acid, glacial acetic acid and vinegar. In each case no turbidity or precipitate was noted at any stage of the testing.

EXAMPLE XI

The procedure of Example VIII was repeated using the undiluted liquid smoke composition of that Example except that the solubilizing agent was Span 60. The composition was clear when formed and remained clear after 48 hours at 110° F. and after 3 months storage in a closed container.

EXAMPLE XII

The procedure of Example VIII was repeated using the undiluted liquid smoke composition of that Example except that the solubilizing agent was polyoxyethylene stearoyl alcohol. The composition was clear when formed and remained clear after 48 hours at 110° F. and after 3 months storage in a closed container.

EXAMPLE XIII

The procedure of Example VIII was repeated using the undiluted liquid smoke composition of that Example except that the solubilizing agent was polyoxyethylene glycol having a molecular weight of 400. The composition was clear when formed and remained clear after 48 hours at 110° F. and after 3 months in a closed container.

EXAMPLE XIV

The procedure of Example VIII was repeated using a liquid smoke composition formed by thoroughly admixing 91 parts by weight of a liquid smoke solution having a phenol concentration of 2000 mg/l and a carbonyl concentration of 5200 mg/l, 6 parts by weight Tween 80 and 3 parts by weight glacial acetic acid. The resulting solution was clear when formed and remained clear after 48 hours heating at 110° F. The solution was placed in a closed container in prolonged storage (3 months) following which the solution was examined. No turbidity or undesirable precipitate was present in the storage container.

EXAMPLE XV

The undiluted liquid smoke compositions of Examples VII-XIV were diluted in the ratio 80 parts water to 20 parts composition and employed as described in Example III to treat frankfurters. Each diluted composition was heated to 110° F. and the frankfurters dipped therein for 30 seconds after which the frankfurters were heated, steamed and showered as described in Example III. The resulting frankfurters exhibited smoky flavor and color comparable to the flavor and color of the frankfurters treated with the undiluted liquid smoke solutions of Example III.

The ability to "smoke" using a diluted liquid smoke composition is a particularly noteworthy characteristic of liquid smoke compositions made in accoradance with the present invention. Not only can "smoking" be accomplished with undiluted compositions but also with compositions diluted in any water to composition ratio up to the ratio 80 parts water to 20 parts composition. Accordingly, the use of significantly smaller quantities of the liquid smoke compositions of the present invention is permitted than with heretofore known compositions without experiencing undesirable solution turbidity and/or solids settlement.

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

What is claimed:
1. A method for making an improved liquid smoke composition comprising admixing:
   (a) a natural liquid smoke solution, said solution including constituent acids, phenols and carbonyls therein;
   (b) a food-grade acidulating agent in addition to the constituent acids in said natural liquid smoke solution; and
   (c) a food-grade solubilizing agent selected from the group consisting of sorbitan fatty compounds, polyoxyethylene sorbitan fatty compounds, polyoxyethylene fatty compounds, polyoxyethylene glycols having molecular weights of at least 400, and mixtures thereof, said fatty compounds being selected from saturated and unsaturated monoacids, saturated and unsaturated mono-alcohols, and mono-esters derived from any of the foregoing fatty compounds;

said acidulating agent comprising at least 2% by weight of said liquid smoke composition for a phenol concentration in said natural liquid smoke solution in the base range from 1500 to less than 2000 mg/l, plus 0.5% by weight for each 500 mg/l increment of phenol concentration above said phenol base range or minus 0.5% by weight for each 500 mg/l increment of phenol concentration below said phenol base range, said solubilizing agent comprising at least 4% by weight of said liquid smoke composition for a carbonyl concentration in said natural liquid smoke solution in the base range from 3000 to less than 3500 mg/l, plus 0.5% by weight for each 500 mg/l increment of carbonyl concentration above said carbonyl base range or minus 0.5% by weight for each 500 mg/l increment of carbonyl concentration below said carbonyl base range.

2. A method, as claimed in claim 1, wherein said acidulating agent is selected from the group consisting of citric acid, acetic acid, formic acid, phosphoric acid, malic acid, ascorbic acid, tartaric acid, lactic acid, tiglic acid, fumaric acid, adipic acid, succinic acid and mixtures thereof.

3. A method, as claimed in claim 2, wherein said acidulating agent is selected from citric acid and acetic acid.

4. A method, as claimed in claim 1, wherein said solubilizing agent fatty chain contains from 12 to 22 carbon atoms.

5. A method, as claimed in claim 4, wherein said solubilizing agent is selected from the group consisting of polyoxyethylene sorbitan mono-oleate, polyoxyethylene sorbitan mono-stearate, polyoxyethylene sorbitan monopalmitate, polyoxyethylene sorbitan monolaurate, sorbitan monostearate, sorbitan mono-oleate, sorbitan trioleate, polyoxyethylene glycols having molecular weights of 400, 4000 and 6000, and mixtures thereof.

6. A method as claimed in claim 5, wherein said solubilzing agent is polyoxyethylene sorbitan mono-oleate.

7. A method, as claimed in claim 1, wherein said acidulating agent comprises from 1.5 to 3% by weight of said liquid smoke composition and said solubilizing agent comprises from 3 to 8% by weight of said liquid smoke composition.

8. A method, as claimed in claim 5, wherein said acidulating agent is selected from the group consisting of citric acid, acetic acid, formic acid, phosphoric acid, malic acid, ascorbic acid, tartaric acid, lactic acid, tiglic acid, fumaric acid, adipic acid, succinic acid, and mixtures thereof.

9. A method, as claimed in claim 8, wherein said acidulating agent comprises from 1.5 to 3% by weight of said liquid smoke composition and said solubilizing agent comprises from 3 to 8% by weight of said liquid smoke composition.

10. A method, as claimed in claim 9, wherein said acidulating agent is selected from citric and acetic acid.

11. A method, as claimed in claim 10, wherein said solubilizing agent is polyoxyethylene sorbitan mono-oleate.

12. A method, as claimed in claim 7, wherein said acidulating agent is selected from the group consisting of citric acid, acetic acid, formic acid, phosphoric acid, malic acid, ascorbic acid, tartaric acid, lactic acid, tiglic acid, fumaric acid, adipic acid, succinic acid and mixtures thereof.

13. A method, as claimed in claim 12, wherein said acidulating agent is selected from citric and acetic acid.

14. A method, as claimed in claim 12, wherein said solubilizing agent is selected from the group consisting of polyoxyethylene sorbitan mono-oleate, polyoxyethylene sorbitan mono-stearate, polyoxethylene sorbitan monopalmitate, polyoxyethylene sorbitan monolaurate, sorbitan monostearate, sorbitan mono-oleate, sorbitan trioleate, polyoxyethylene glycols having molecular weights of 400, 4000 and 6000, and mixtures thereof.

15. A method, as claimed in claim 14, wherein said solubilizing agent is polyoxyethylene sorbitan mono-oleate.

16. A method, as claimed in claim 1, wherein said acidulating agent comprises from 1.5 to 3% by weight of said liquid smoke composition.

17. A method, as claimed in claim 1, wherin said solubilizing agent comprises from 3 to 8% by weight of said liquid smoke composition.

18. An improved liquid smoke composition consisting essentially of:
(a) a natural liquid smoke solution, said solution including constituent acids, phenols and carbonyls therein;
(b) a food-grade acidulating agent in addition to the constituent acids in said natural liquid smoke solution; and
(c) a food-grade solubilizing agent selected from the group consisting of sorbitan fatty compounds, polyoxyethylene sorbitan fatty compounds, polyoxyethylene fatty compounds, polyoxyethylene glycols having molecular weights of at least 400, and mixtures thereof, said fatty compounds being selected from saturated and unsaturated mono-acids, saturated and unsaturated mono-alcohols,, and mono-esters derived from any of the foregoing fatty compounds;

said acidulating agent comprising at least 2% by weight of said liquid smoke composition for a phenol concentration in said natural liquid smoke solution in the base range from 1500 to less than 2000 mg/l, plus 0.5% by weight for each 500 mg/l increment of phenol concentration above said phenol base range or minus 0.5% by weight for each 500 mg/l increment of phenol concentration below said phenol base range, said solubilizing agent comprising at least 4% by weight of said liquid smoke composition for a carbonyl concentration in said natural liquid smoke solution in the base range from 3000 to less than 3500 mg/l,plus 0.5% by weight for each 500 mg/l increment of carbonyl concentration above said carbonyl base range or minus 0.5% by weight for each 500 mg/l increment of carbonyl concentration below said carbonyl base range; said natural liquid smoke solution comprising substantially the balance of said composition.

19. A composition, as claimed in claim 18, wherein said acidulating agent is selected from the group consisting of citric acid, acetic acid, formic acid, phosphoric acid, malic acid, ascorbic acid, tartaric acid, lactic acid, tiglic acid, fumaric acid, adipic acid, succinic acid, and mixtures thereof.

20. A composition, as claimed in claim 19, wherein said acidulating agent is selected from citric acid and acetic acid.

21. A composition, as claimed in claim 18, wherein said solubilizing agent fatty chain contains from 12 to 22 carbon atoms.

22. A composition, as claimed in claim 21, wherein said solubilizing agent is selected from the group consisting of polyoxyethylene sorbitan mono-oleate, polyoxyethylene sorbitan monostearate, polyoxyethylene sorbitan monopalmitate, polyoxyethylene sorbitan monolaurate, sorbitan monostearate, sorbitan mono-oleate, sorbitan trioleate, polyoxyethylene glycols having molecular weights of 400, 4000 and 6000, and mixtures thereof.

23. A composition, as claimed in claim 22, wherein said solubilizing agent is polyoxyethylene sorbitan mono-oleate.

24. A composition as claimed in claim 18, wherein said acidulating agent comprises from 1.5 to 3% by weight of said liquid smoke composition and said solubilizing agent comprises from 3 to 8% by weight of said liquid smoke composition.

25. A composition, as claimed in claim 23, wherein said acidulating agent is selected from the group consisting of citric acid, acetic acid, formic acid, phosphoric acid, malic acid, ascorbic acid, tartaric acid, lactic acid, tiglic acid, fumaric acid, adipic acid, succinic acid, and mixtures thereof.

26. A composition, as claimed in claim 25, wherein said acidulating agent comprises from 1.5 to 3% by weight of said liquid smoke composition and said solubilizing agent comprises from 3 to 8% by weight of said liquid smoke composition.

27. A composition, as claimed in claim 26, wherein said acidulating agent is selected from citric and acetic acid.

28. A composition, as claimed in claim 27, wherein said solublizing agent is polyoxyethylene sorbitan mono-oleate.

29. A composition, as claimed in claim 24, wherein said acidulating agent is selected from the group consisting of citric acid, acetic acid, formic acid, phosphoric acid, malic acid, ascorbic acid, tartaric acid, lactic acid, tiglic acid, fumaric acid, adipic acid, succinic acid, and mixtures thereof.

30. A composition, as claimed in claim 29, wherein said acidulating agent is selected from citric acid and acetic acid.

31. A composition, as claimed in claim 29, wherein said solubilizing agent is selected from the group consisting of polyoxyethylene sorbitan mono-oleate, polyoxethylene sorbitan monostearate, polyxyethylene sorbitan monopalmitate, polyoxyethylene sorbitan monolaurate, sorbitan monostearate, sorbitan mono-oleate, sorbitan trioleate, polyoxyethylene glycols having molecular weights of 400, 4000 and 6000, and mixtures thereof.

32. A composition, as claimed in claim 31, wherein said solubilizing agent is polyoxyethylene sorbitan mono-oleate.

* * * * *